Feb. 27, 1951 L. L. TOMAN 2,543,479

INDUCTANCE TUNING UNIT

Filed May 11, 1948

INVENTOR.
LEE L. TOMAN
BY
Brown, Denk & Lynnestvedt
AGENTS

Patented Feb. 27, 1951

2,543,479

UNITED STATES PATENT OFFICE 2,543,479

INDUCTANCE TUNING UNIT

Lee L. Toman, Philadelphia, Pa., assignor to Philco Corporation, Philadelphia, Pa., a corporation of Pennsylvania Application May 11, 1948, Serial No. 26,285

5 Claims. (Cl. 171—242)

Figures 1, 2:
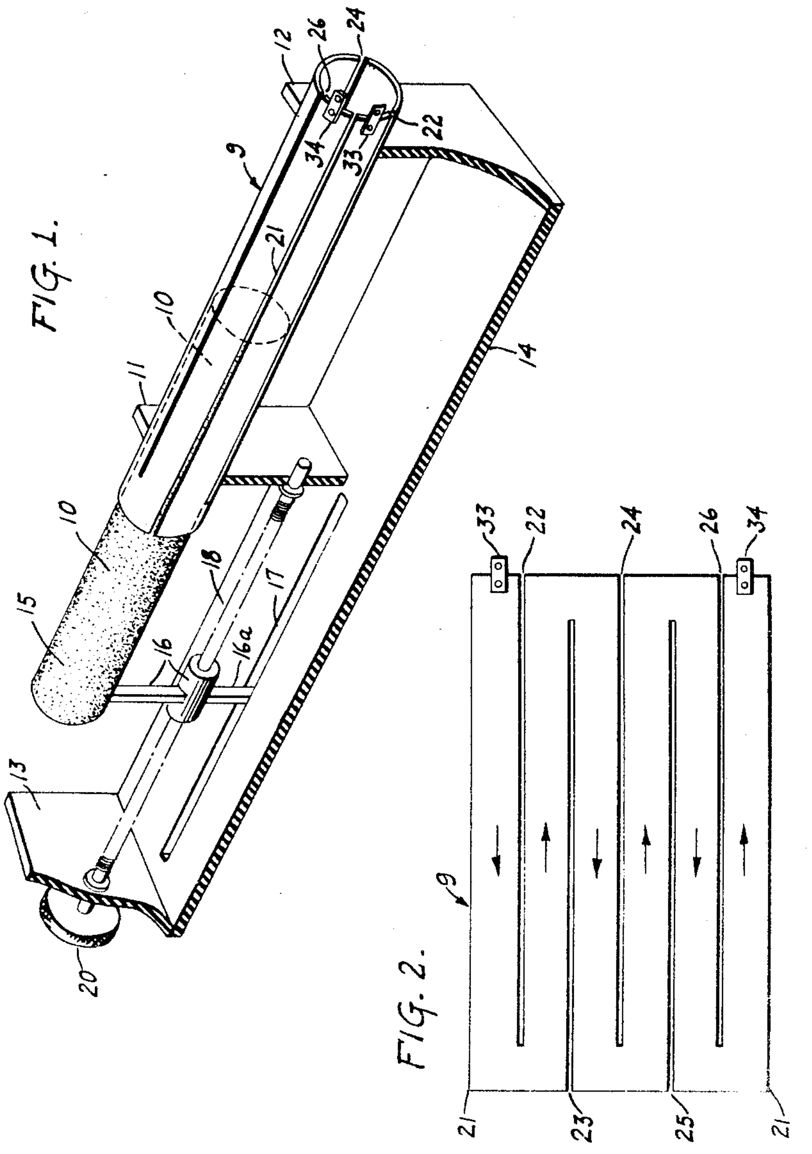

The invention herein described and claimed relates to a new inductor of improved construction having excellent electrical characteristics.

The mechanical construction of the new inductor is simple, and mass production methods may be employed to keep the unit cost relatively low. Uniformity of inductance among mass-produced units may be attained by merely meeting commercial tolerances with respect to the physical dimensions of the inductor.

The inductor of the present invention may be employed to advantage as the inductance element in the tuned circuit of apparatus required to operate at high frequencies, particularly where the tuned circuit is permeability tuned. For example, the new inductor may be employed in the permeability tuner assembly of a radio-frequency amplifier stage of a frequency-modulation receiver, the presently assigned frequency-modulation band being 88 to 108 megacycles. When so employed, the new inductor facilitates accuracy of tuning, for, while its inductance is relatively low, its physical dimensions per unit of inductance are large. Moreover, I have found the Q factor of the new inductor to be high and relatively constant over the tuning range.

It is an object then of this invention to provide an inductor of simple mechanical construction having good electrical characteristics at high frequencies.

Another object of this invention is to provide an inductor having low inductance and relatively large physical dimensions per unit of inductance whereby permeability tuning at high frequencies may be accomplished with increased accuracy and facility.

Another object of this invention is to provide an improved permeability tuner assembly for high frequency applications.

These and other objects, features and advantages of the present invention, and the manner in which the objects are attained, will become clear from a consideration of the following detailed description and of the accompanying drawings wherein:

Figure 1 is a perspective view, partly in section, of the new inductor as employed in a permeability tuner assembly; and Figure 2 is an illustration which will be helpful in understanding the construction of the new inductor.

Referring now to Figure 1, there is shown a permeability tuner assembly comprising the new inductor 9, a core 10, and suitable means for moving core 10 within the magnetic field of inductor 9.

Inductor 9 comprises a tube, preferably cylindrical, of copper or other non-magnetic material of good conductivity. The wall of the tube is provided with a slit 21 which, as shown in Figure 1, extends axially the entire length of the tube. The tube also has a plurality of slots, 22—26, which are displaced from each other about the tube and which extend axially from one extremity of the tube toward, but not to, the other extremity. Adjacent slots extend from opposite extremities of the tube, and each slot is of such length that a substantial portion of the slot is coextensive axially with a substantial portion of the adjacent slots. In a preferred embodiment, the slots, 22—26, are equally spaced about the tube and are of substantially equal length.

The preferred arrangement of slots 22—26 may be seen more clearly in Figure 2 where the inductor tube is assumed to be rolled out flat in a single plane. Observe that alternate slots, such as 22, 24, 26, extend from a common extremity of the tube toward, but not to, the other end, and that substantial portions of adjacent slots are axially coextensive. Consequently, a single conductive path extends between opposing edges of the slit 21. This path winds back and forth in serpentine fashion, the major portion of the total length of the path being lengthwise of the tube. The arrows, in Figure 2, indicate the direction in which the current flows at a particular instant of time. An instant later the direction is reversed. At each extremity of the conductive path, the inductor may be equipped with a terminal lug, 33, 34, to which external circuit connections may be conveniently made.

When the slotted inductor tube of the present invention is used as the inductance element in a permeability tuner assembly, the inductance is varied, as is conventional, by varying the position of a core of magnetic material with respect to the magnetic field of the inductor. In Figure 1, the slotted inductor tube 9 is shown to be mounted upon a base 14 by means of a pair of insulating support members 11 and 12. Any suitable means (not shown) may be used to secure the inductor tube 9 to the support members 11 and 12. If desired, base 14, support members 11 and 12, and front section 13, may be integral parts of a molded unit of insulating material.

Core 10, of powdered iron or other low-loss material of high permeability, is preferably at least as long as that portion of tube 9 which is provided with the axially coextensive portions of slots 22—26. Core 10 is so mounted as to be insertable adjustably within the slotted tube of the inductor without coming into electrical contact therewith. Prevention of electrical contact between tube 9 and core 10 may be accomplished by maintaining the core 10 at spaced separation from the interior wall of the inductor tube, or by providing the core, or the tube, or both, with an insulated surface. In Figure 1, the surface of core 10 is assumed to be coated with an insulating material 15.

Core 10 may be mounted in any suitable manner, the particular means employed forming no part of the novelty of the present invention. In Figure 1, the end of core 10 is rigidly secured to a screw-follower 16 which is adapted to move axially along screw 18 when the screw is rotated, as by means of control knob 20. The lower portion of screw-follower 16 is in the form of a pin 16a which moves along a groove or channel 17. The sides of channel 17 prevent lateral movement of pin 16a and thus screw-follower 16 is prevented from rotating.

As will be readily understood, rotation of knob 20 effects axial movement of core 10 within the tube 9, and axial movement of core 10 within tube 9, particularly within that portion of tube 9 which is provided with the coextensive portions of slots 22—26, varies the inductance of the tube. For, if a larger portion of core 10 be moved into the said slotted portion of the tube, the number of magnetic lines of force in that portion of the tube newly occupied by the core 10 will increase, and the inductance of inductor 9 will be increased. Conversely, if core 10 be so moved that a smaller portion of the core remains within the said slotted portion of the tube, the number of lines of force in the region no longer occupied by the core 10 will be decreased, and the inductance of inductor 9 will be lessened.

For high frequency applications, the inductor of the present invention has a number of advantages over the conventional wire-wound inductor.

In the first place, I have not only found the Q factor of the new inductor to be high enough to compare favorably with that of good prior art wire-wound inductors but, in addition, I have found the Q factor to remain relatively constant throughout the tuning range. In other words, the graph of the Q factor plotted against frequency is noticeably flatter than that obtained with prior art wire-wound inductors. The reasons for this improvement are not completely understood, but experiment has proved this to be the case. A flatter Q-factor characteristic is, of course, highly desirable since it permits more uniform gain to be obtained over the range of operating frequencies. I have also observed that the distributed capacitance of the new inductor tends to remain relatively constant over the tuning range.

Another advantage of the new inductor is that, for a given inductance and given Q factor, its physical size may be substantially larger than that of a conventional wire-wound inductor. This facilitates accuracy of tuning.

An additional advantage is that the structure of the new inductor is simple and permits of mass production at relatively low cost.

Another important advantage is that the two extremities of the sinuous conductive path may be conveniently located at a common end of the inductor, as indicated by the locations of lugs 33, 34, thus reducing troublesome lead inductance.

The present invention contemplates that an inductor tube of given diameter and given length may be given various values of inductance merely by varying the number of slots. Consequently, within certain limits, the inductor tube may be standardized with respect to its diameter and/or length.

Alternatively, an inductor tube of given inductance may, if desired, be made in a variety of tube diameters and lengths, merely by employing different numbers of slots.

The following values are given to illustrate one specific inductor which may be built and used in accordance with the present invention. The values given are, of course, by way of example only and are not intended to be limited. The tube may be copper and may have an inside diameter of 0.5 inch and a length of 3.0 inches. It may be slotted at the 90° points to give one full-length slit and three slots, portions of adjacent slots being axially coextensive as shown in Figure 2. Each slot may be 2.6 inches long. The core may be high frequency permaloy and may have a diameter of 3/8 inch and a length of 2.2 inches. When provided with suitable shunt capacitance, the inductor described has a tuning range of from 88 to 108 megacycles and a Q factor of about 150.

Having described my invention, I claim:

1. Apparatus functioning as an inductor in an electrical circuit, said apparatus comprising a tube of conductive material, said tube being provided with a slit through the wall thereof, said slit extending axially throughout the length of the tube, said tube further being provided with a plurality of slots through the wall thereof, said slots being spaced about said tube and extending axially from one extremity of the tube toward the other but terminating short thereof, adjacent of said slots extending from opposite extremities of said tube and having axially coextensive portions so that a single conductive path obtains between opposing edges of said slit, said path having a serpentine configuration, and a pair of terminals, one at each end of said serpentine path.

2. Apparatus functioning as an inductor in an electrical circuit, said apparatus comprising a cylindrical tube of conductive material, said tube being provided with a slit through the wall thereof, said slit extending axially throughout the length of the tube, said tube being further provided with a plurality of slots through the wall thereof, said slots being spaced substantially equally about the circumference of said tube and extending axially from one extremity of the tube toward the other but terminating short thereof, adjacent of said slots extending from opposite extremities of said tube and having axially coextensive portions so that a single conductive path obtains between opposing edges of said slit, said path having a serpentine configuration, and a pair of terminals, one at each end of said serpentine path.

3. A high-frequency inductance tuning unit comprising an inductor of substantial length and a core of magnetic material movable within said inductor along the longitudinal axis thereof, said inductor being comprised of conductive material in the form of a hollow cylinder having a longitudinal split in the wall thereof extending throughout the full length of said cylinder and having a plurality of circumferentially-spaced slots in the wall thereof extending longitudinally from one end of said cylinder toward but terminating short of the other end, adjacent slots extending from opposite ends of said cylinder and having longitudinally coextensive portions, thus providing a serpentine conductive path between opposite edges of said longitudinal split, said path having longitudinally-extending straightaway portions, and a pair of terminals, one at each end of said serpentine path.

4. An inductance tuning unit comprising: an inductor comprising a conductor which winds back and forth in a serpentine path, said path being characterized by relatively long longitudinal portions and short transverse portions, said longitudinal portions being longitudinally coextensive, substantially parallel to each other and defining a cylindrical surface slit at one point throughout its longitudinal length; a pair of terminals, one at each end of said conductor on opposite sides of said longitudinal slit; a core of magnetic material; and means for moving said core within the area defined by said cylindrical surface in a direction substantially parallel to that of the longitudinal portions of said conductor.

5. An inductance tuning unit as claimed in claim 4 characterized in that both ends of said conductor are located at the same end of said defined cylindrical surface.

LEE L. TOMAN.

REFERENCES CITED

The following references are of record in the file of this patent:

UNITED STATES PATENTS

| Number | Name | Date |
|---|---|---|
| 2,251,631 | Mayer | Aug. 5, 1941 |
| 2,252,092 | Newman | Aug. 12, 1941 |
| 2,368,857 | McClellan | Feb. 6, 1945 |

FOREIGN PATENTS

| Number | Country | Date |
|---|---|---|
| 456,002 | Great Britain | Nov. 2, 1936 |